United States Patent
Racky et al.

[11] 3,883,474
[45] May 13, 1975

[54] FLAME RESISTANT THERMOPLASTIC POLYESTERS

[75] Inventors: Werner Racky, Wiesbaden; Hans-Jerg Kleiner, Bad Soden, Taunus, both of Germany

[73] Assignee: Hoechst Aktiengesellschaft, Frankfurt am Main, Germany

[22] Filed: Nov. 28, 1973

[21] Appl. No.: 419,528

[52] U.S. Cl.. 260/45.75 B; 260/40 R; 260/45.95 C; 260/45.95 D
[51] Int. Cl............................................. C08g 51/58
[58] Field of Search.. 260/45.95 D, 606.5 P, 45.7 P, 260/45.75 B, 45.95 C

[56] References Cited
UNITED STATES PATENTS

| | | | |
|---|---|---|---|
| 3,267,149 | 8/1966 | Garner............................. | 260/606.5 |
| 3,306,937 | 2/1967 | Clampitt et al.................. | 260/606.5 |
| 3,341,625 | 9/1967 | Gillham et al..................... | 260/45.7 |
| 3,706,821 | 12/1972 | Anderson et al................ | 260/45.95 |
| 3,716,580 | 2/1973 | Maier............................... | 260/606.5 |

Primary Examiner—V. P. Hoke
Attorney, Agent, or Firm—Curtis, Morris & Safford

[57] ABSTRACT

Flame resistant polyester composition which contains phosphine oxide derivatives of the formula

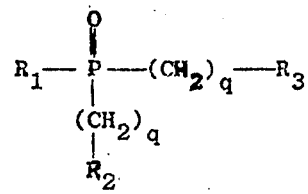

wherein $R_1$ is an alkyl radical having from 1 to 6 carbon atoms, $R_2$ is hydrogen or aryloxy of the formula

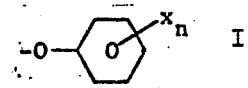

wherein $R_3$ is aryloxy of the formula I or, if $R_2$ is hydrogen $R_3$ may have the structure

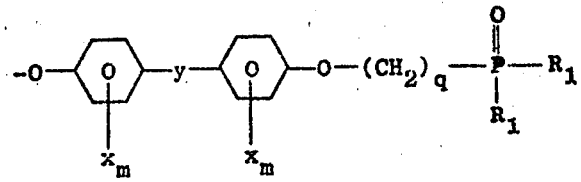

wherein $x$ is Cl or Br, $y = O$, $SO_2$ or $R_4—C—R_4$ in which $R_4$ is hydrogen or alkyl, having from 1 to 6 carbon atoms and $n = 0$ to 5, $m = 0$ to 4, and $q = 1$ to 4.

10 Claims, No Drawings

FLAME RESISTANT THERMOPLASTIC POLYESTERS

The present invention relates to flame resistant thermoplastic polyesters.

It is known to make polymers fireproof by incorporating certain additives. As good fire retarding agents for plastics compounds or phosphorus and halogen containing substances or components, which contain phosphorus and halogen in the molecule, are suitable.

For linear saturated polyesters, such as polyethylene or polybutylene terephthalate, fire retarding additives which are resistant to hydrolysis at temperatures of between 220°C and 280°C are required. Furthermore, the fire retarding substance must possess a slight volatility at increased temperature and reduced pressure.

It has now been found that polyesters which contain compounds of the general formula

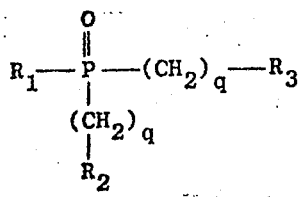

wherein $R_1$ represents a saturated, open-chain, optionally branched, or cyclic alkyl radical having from 1 to 6 carbon atoms, preferably an alkyl radical having from 1 to 3 carbon atoms, $R_2$ is hydrogen or aryloxy of the formula

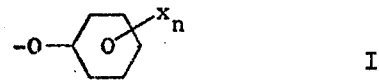

I $R_3$ is aryloxy of the formula I or, if $R_2$ is hydrogen, $R_3$ may have the general structure

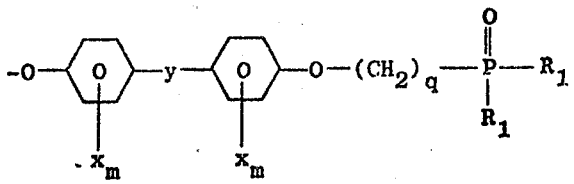

Wherein $x =$ Cl or Br, $y = -$, O, S, SO$_2$, preferably $R_4$—C—$R_4$ in which $R_4$ is hydrogen or alkyl having from 1 to 6, or from 1 to 3 carbon atoms, $n = 0$ to 5, preferably 3 to 5, $m = 0$ to 4, preferably from 1 to 2, $q = 1$ to 4, preferably 1, are flame resistant, self-extinguishing or non-combustible.

The flameproof polyester moulding compositions of the invention contain phosphine oxide derivatives in quantities of from 3 to 30 percent by weight, preferably from 4 to 20 percent by weight, calculated on the weight of the moulding composition.

By adding Sb$_2$O$_3$ to the halogen containing fire retarding agents contained in the polyester of the invention an additional fire retarding effect can be obtained, the amount of Sb$_2$O$_3$ being between 1 and 15 percent by weight, preferaly between 2 and 10 percent by weight, in each case calculated on the weight of the moulding composition.

Examples of the compounds of the invention are: dimethyl-2,4-Dichloro-phenoxymethyl-phosphine oxide dimethyl-2,4,6-Trichloro-phenoxymethyl-phosphine oxide dimethyl-2,4,6-Tribromo-phenoxymethyl-phosphine oxide dimethyl-2,3,4,5,6-Pentachloro-phenoxymethyl-phosphine oxide dimethyl-2,3,4,5,6-Pentabromo-phenoxymethyl-phosphine oxide 2,2-bis-[4-(dimethylphosphinyl-methoxy)-phenyl]-propane 2,2-bis-[3,5-dibromo-4-(dimethylphosphinyl-methoxy)-phenyl]-propane 2,2-bis-[2,3,5-tribromo-4-(dimethylphosphinyl-methoxy)-phenyl]-propane methyl-bis-[2,4-dichloro-phenoxymethyl]-phosphine oxide methyl-bis-[2,4,6-trichloro-phenoxymethyl]-phosphine oxide methyl-bis-[2,4,6-tribromo-phenoxymethyl]-phosphine oxide methyl-bis-[2,3,4,5,6-pentachloro-phenoxyethyl]-phosphine oxide methyl-bis-[2,3,4,5,6-pentabromo-phenoxymethyl]-phosphine oxide The preparation of the halogenated and halogen-free dimethyl-aryloxy-methyl-phosphine oxides is described in U.S. Patent application Ser. No. 419,549, filed concurrently herewith. The halogenated methyl-bis-aryloxy-methyl-phosphine oxides are prepared by reacting methyl-bis-chloro-methyl-phosphine oxide with halogenated sodium phenolates, as described in the U.S.S.R. patent specification No. 173,765 for the compounds free from halogen.

The compounds are thermally stable, do not decompose linear saturated polyesters when they are incorporated therein and are not detrimental to the preparation of these thermoplastics.

In order to satisfy the requirements of low volatility of the flame resistant agents contained in the polyester of the invention compounds with high molecular weight and small vapor pressure are preferably used.

The aforesaid compounds can be added at any time in the polyester preparation.

If a catalytic melt condensation to a polyester is carried out in the presence of the phosphine oxide derivatives a portion thereof can evaporate from the reaction mixture depending on the vapor pressure of the compound concerned. This portion can be recycled.

It is more expedient to finish the melt condensation of the polyester and then introduce the flame retarding agent, after normalization of the pressure, into the polyester melt. It is likewise possible to mix the flame resistant additives with finished polyester granules and to process this mixture directly, for example on injection moulding machines, or melt it first in an extruder, granulate and after drying, process into moulded articles.

Colourless flame resistant polyesters are obtained which, depending on the quantity of flame retarding agents, are estimated according to ASTM D 635-68 as self-extinguishing or non-combustible.

The polyester part of the moulding composition has a reduced specific viscosity, measured in a 1 percent solution in phenol/tetrachlorethane 60 : 40 at 25°C, of from 0.5 to 2.0 dl/g, preferably from 0.5 to 1.5 dl/g.

Also polyesters with lower reduced specific viscosity can be prepared at first and the desired viscosity obtained by subsequent condensation in the solid phase.

In addition to the phosphine oxide derivatives also inorganic fibre materials, for example, glass fibres, but also fibres of quartz, asbestos or carbon, can be incorporated into the polyester.

The thickness especially of the glass fibres is from 0.1 to 50 microns and preferably from 3 to 15 microns, their length is from 0.01 to 5 mm. The quantity of the fibres used may be up to 50 percent by weight, preferably from 10 to 30 percent by weight, calculated on the moulding composition.

Furthermore, the moulding compositions may contain also other known additives, such as stabilizers, lubricants, dyestuffs, fillers, nucleating agents, adhesion promoters and antistatically acting compounds.

As linear saturated polyesters the moulding composition of the invention should contain preferably polyethylene terephthalate, polypropylene terephthalate or polybutylene terephthalate.

The polyesters are prepared according to known processes. For example, in the preparation of the polyethylene terephthalate a low dialkyl ester of terephthalic acid, preferably the dimethyl ester, is used as starting material which is transesterified with an excess of glycol in the presence of suitable catalysts to yield the bis-hydroxyethyl ester of terephthalic acid, while increasing the temperature from 140° to 210°C to 225°C. The aliphatic alcohol set free is distilled off. For the polycondensation which is carried out at a temperature of from 250°C to 280°C, the pressure is reduced in stages to a value of below 1 mm Hg.

In addition to unmodified also modified thermoplastic polyesters can be made fire resistant, according to the invention for example, those which contain, as well as terephthalic acid, also other aromatic or aliphatic dicarboxylic acids as acid component, for example isophthalic acid, naphthalene-2,6-dicarboxylic acid or adipic acid. Also other saturated aliphatic or cycloaliphatic diols can be used, for example 1,4-dimethylolcyclohexane or neopentylglycol.

The quantity of modifying acid or diol components should not exceed approximately 10 mol percent, calculated on the total quantity of dicarboxylic acid or diol.

The fire-proof polyester moulding composition of the invention is suitable for the preparation of moulded articles, for example by compression moulding, injection moulding or extrusion. In the case of the injection moulding of polyethylene terephthalate it is advantageous to heat the mould to a temperature of from 20°C to 160°C, preferably from 100°C to 150°C, since then the polyester portion of the moulding composition crystallizes with the aid of a nucleating agent to a degree which guarantees a high degree of stiffness and hardness of the moulded articles. Polybutylene terephthalate can be injection molded in an unheated mold without the addition of nucleating agents. The moulded articles are distinguished by low shrinkage and high dimensional stability.

The flame-resistant polyester of the invention is especially suitable for the preparation of casings, structural parts of electrical apparatus, mechanical transmission parts in automatic machines, hollow articles, structural units in computer equipment and sensitive electronic apparatus. Fibres, filaments and sheets can likewise be prepared from it.

The follwing examples illustrate the invention.

EXAMPLES

Finely ground polyethylene terephthalate or polybutylene terephthalate respectively was dried thoroughly at 160°C and 0.5 mm/Hg and mixed intimately with the quantities given in the table of the respective phosphine oxide derivative by a stirrer.

The mixtures of phosphine oxide and polyethylene terephthalate were moulded to plates at a temperature of 240°C and a pressure of, at first 10 atmospheres gauge for approximately 5 minutes, then for a further 5 minutes at 100 atmospheres.

Polybutylene terephthalate mixtures were moulded to plates at a temperature of 220°C under otherwise the same conditions. From these plates bars were cut having the measurements 127 × 12.7 × 1.3 mm, the burning properties of which were tested according to ASTM D 635-68. The results are summarized in the following table:

| Example | Polyester | Flame retarding agent | Percent by weight | RSV of the plate dl/g | Flame test ASTM D 635-68 |
|---|---|---|---|---|---|
| 1 | PET | – | – | 0.85 | combustible |
| 2 | PET | $DMPO-CH_2-OC_6Cl_5$ | 5 | 0.95 | self-extinguishing |
| 3 | PET | $DMPO-CH_2-OC_6Br_5$ | 7 | 0.87 | self-extinguishing |
| 4 | PET | $DMPO-CH_2-OC_6Br_5$ + $Sb_2O_3$ | 4.4 / 5.2 | 0.63 | non-combustible |
| 5 | PET | $[DMPO-CH_2-O-C_6H_4-O]_2C(CH_3)_2$ | 5 | 0.92 | self-extinguishing |
| 6 | PET | $[DMPO-CH_2-O-C_6H_3Br-O]_2C(CH_3)_2$ | 5.5 | 0.90 | self-extinguishing |

| Example | Polyester | Flame retarding agent | percent by weight | RSV of the plate dl/g | Flame test ASTM D 635-68 |
|---|---|---|---|---|---|
| 7 | PET | $DMPO-CH_2-OC_6Br_5$ | 15 | 0.71 | non-combustible |
| 8 | PBuT | - | - | 1.05 | combustible |
| 9 | PBuT | $DMPO-CH_2-OC_6Br_5$ | 15 | 1.04 | self-extinguishing |
| 10 | PBuT | $DMPO-CH_2-OC_6Cl_5$ | 15 | 1.03 | self-extinguishing |
| 11 | PBuT | 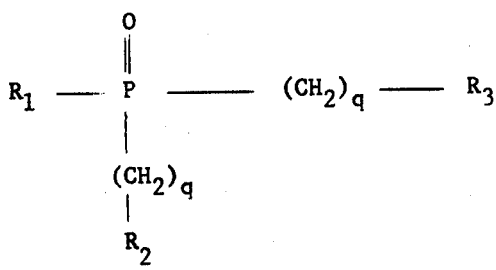 | 15 | 0.95 | self-extinguishing to non-combustible |

PET = polyethylene terephthalate

PBuT = polybutylene terephthalate

DMPO = 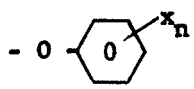

What we claim is:

1. A flame-resistant thermoplastic polyester molding composition comprising a linear saturated polyester and a flame-resisting amount of a flame-retarding compound of the general formula:

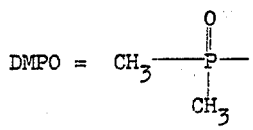

wherein $R_1$ represents an alkyl radical having from 1 to 6 carbon atoms, $R_2$ is hydrogen or an aryloxy radical of the formula:

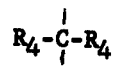

$R_3$ is aryloxy of formula 1, or if $R_2$ is hydrogen, $R_3$ may have the general structure:

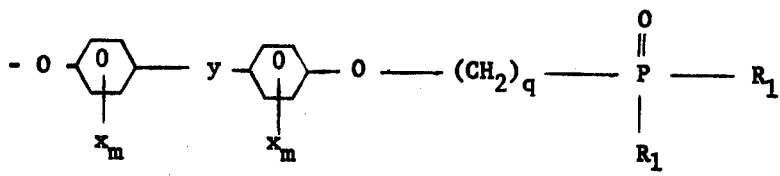

wherein $x$ is Cl or Br, $y$ is -, O, S, $SO_2$, or $$R_4-\underset{|}{\overset{|}{C}}-R_4$$

wherein $R_4$ is hydrogen or alkyl having from 1 to 6 carbon atoms, $n$ is 0 to 5, $m$ is 0 to 4 and $q$ is 1 to 4.

2. Moulding composition as claimed in claim 1, containing the phosphine oxide derivative in a quantity of from 3 to 30 percent by weight, calculated on the weight of the moulding composition.

3. Moulding composition as claimed in claim 1, containing a halogen containing phosphine oxide derivative and from 1 to 15 percent by weight, of antimonytrioxide, calculated on the weight of the moulding composition.

4. Moulding composition as claimed in claim 1, wherein the polyester portion has a reduced specific viscosity of between 0.5 and 2.0 dl/g.

5. Moulding composition as claimed in claim 1, containing fillers for reinforcement.

6. A molding composition as claimed in claim 1 wherein said flame-retarding compound is present to the extent of 4 to 20% by weight, based on the weight of the molding composition.

7. Molded articles molded from the composition of claim 1.

8. Sheets, fibers and filaments molded from the molding composition of claim 1.

9. A flame-resistant thermoplastic polyester molding composition comprising a linear saturated polyester and a flame-resisting amount of a flame-retarding compound of the general formula:

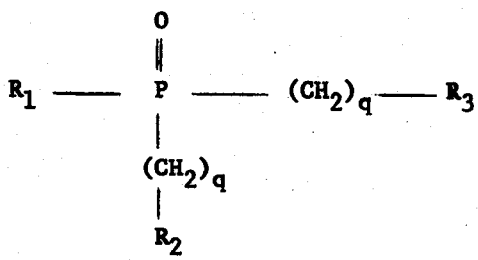

wherein $R_1$ represents an alkyl radical having from 1 to 3 carbon atoms, $R_2$ is hydrogen or aryloxy of the formula

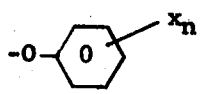

I $R_3$ is aryloxy of formula I or if $R_2$ is hydrogen, $R_3$ may have the general structure:

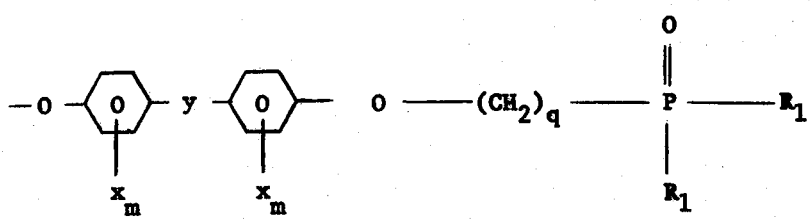

wherein $x$ is Cl or Br, $y$ is

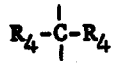

wherein $R_4$ is hydrogen or alkyl of 1 to 3 carbon atoms, $n$ is 3 to 5, $m$ is 1 to 2 and $q$ is 1.

10. A process for making a linear saturated polyester and a flame-resistant polyester which comprises incorporating in a linear saturated polyester during or after the preparation thereof a flame-resisting amount of a flame-retarding compound of the general formula:

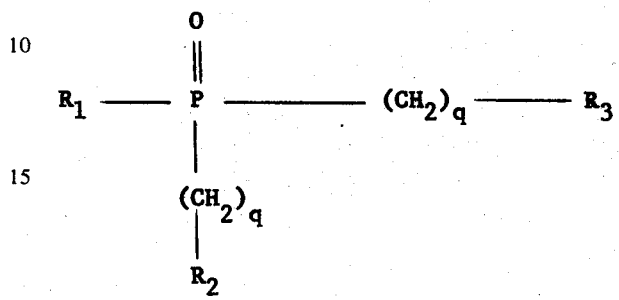

wherein $R_1$ represents an alkyl radical having from 1 to 6 carbon atoms, $R_2$ is hydrogen or aryloxy of the formula:

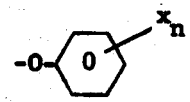

$R_3$ is aryloxy of formula I or if $R_2$ is hydrogen, $R_3$ may have the general structure:

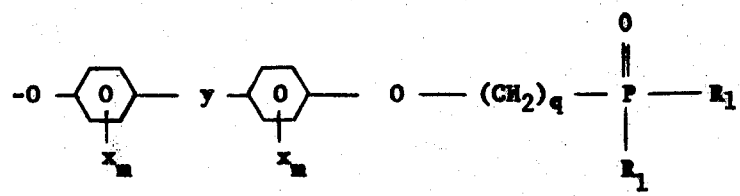

wherein $x$ is Cl or Br, $y$ is -, O, S, $SO_2$ or $R_4$—C—$R_4$ wherein $R_4$ is hydrogen or alkyl having from 1 to 6 carbon atoms, $n$ is 0 to 5, $m$ is 0 to 4 and $q$ is 1 to 4.

* * * * *

UNITED STATES PATENT OFFICE
CERTIFICATE OF CORRECTION

PATENT NO. : 3,883,474
DATED : May 13, 1975
INVENTOR(S) : Racky et al.

It is certified that error appears in the above-identified patent and that said Letters Patent are hereby corrected as shown below:

In the Heading:
    After Item [21], the following should be inserted:
[30]  Foreign Application Priority Data
    November 30, 1972    Germany.......P 22 58 663.6

Signed and Sealed this twenty-second Day of July 1975

[SEAL]

Attest:

RUTH C. MASON
Attesting Officer

C. MARSHALL DANN
Commissioner of Patents and Trademarks